United States Patent [19]

Webb et al.

[11] 4,015,538

[45] Apr. 5, 1977

[54] CARCASS TRANSFER METHOD AND DEVICE

[75] Inventors: Harry B. Webb; James W. Lee, both of Ocala, Fla.; Robert B. Blair, Guymon, Okla.

[73] Assignee: Swift and Company Limited, Chicago, Ill.

[22] Filed: May 27, 1975

[21] Appl. No.: 580,904

[52] U.S. Cl. .................................. 104/97; 91/4 R
[51] Int. Cl.² ...................................... B66B 9/20
[58] Field of Search ............. 104/97; 187/9 R, 9 E, 187/7; 17/21, 23, 24; 91/4, 420; 214/512, 132, DIG. 12, 75 R

[56] References Cited

UNITED STATES PATENTS

| | | | |
|---|---|---|---|
| 2,743,833 | 5/1956 | Peterson | 214/512 X |
| 2,772,797 | 12/1956 | Schreck | 104/97 X |
| 2,903,147 | 9/1959 | Davis, Jr. | 214/512 |
| 3,507,189 | 4/1970 | Beckett et al. | 91/4 |

FOREIGN PATENTS OR APPLICATIONS 1,228,089  4/1971  United Kingdom ............... 91/4 R Primary Examiner—Robert J. Spar
Assistant Examiner—James M. Slattery
Attorney, Agent, or Firm—Edward T. McCabe; Charles E. Bouton; Raymond M. Mehler

[57] ABSTRACT

An improved carcass transfer method and device are provided by which a single operator can readily raise, lower, and transport a whole beef carcass or other carcass to facilitate movement of the carcass both off of and onto overhead rail systems conventionally used for carcass transport and storage in meat packing plants. A portable cantilevered device having a lifting mechanism engages a roller-type trolley from which a carcass is suspended. The lifting mechanism preferably includes a hydraulic cylinder, which cylinder is in controlled communication with an oil reservoir. Pressurized air actuates various valves to effect a desired raising or lowering of the mast.

5 Claims, 5 Drawing Figures

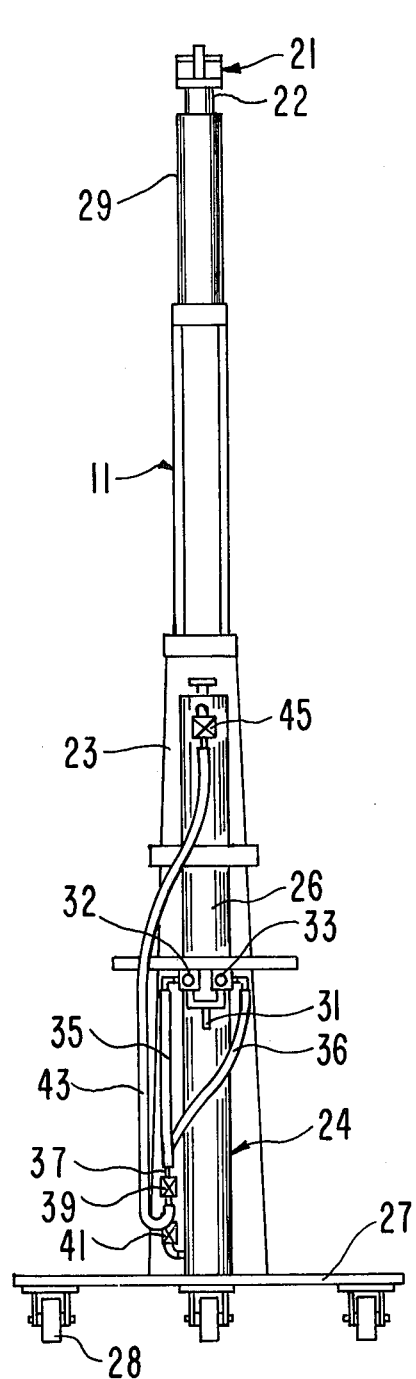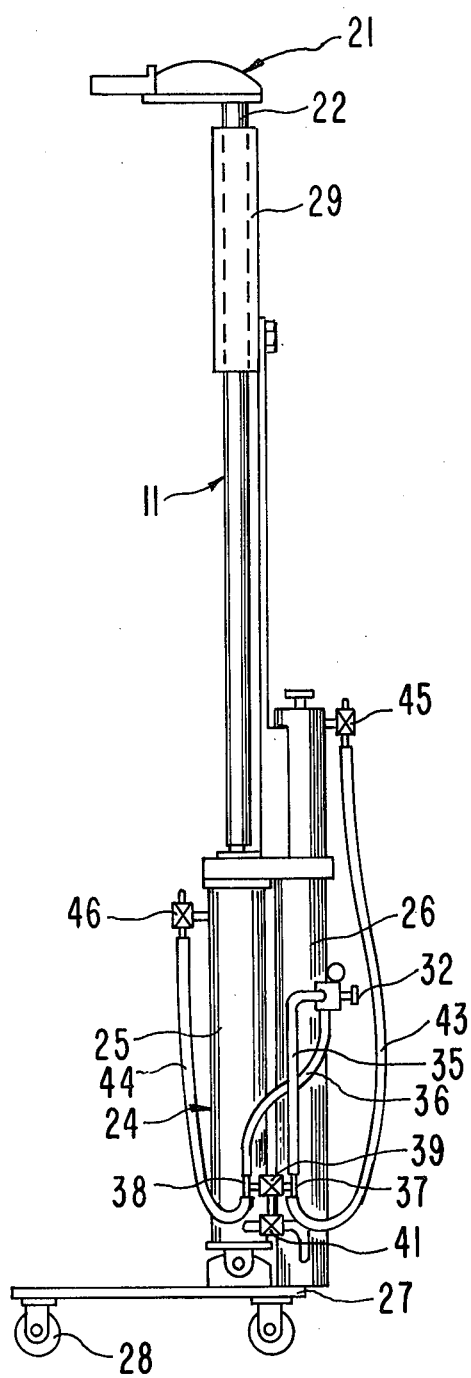

CARCASS TRANSFER METHOD AND DEVICE

This invention relates generally to a method and a device for suspending and transporting animal carcasses, more specifically the present invention comprises a method and apparatus for moving a carcass and a carcass suspending device off a rail and between locations on an overhead rail system.

It is customary in meat packing plants to utilize an overhead rail system for transporting animal carcasses between various processing stations from slaughtering to shipping. At one such processing station there is accomplished a grading of the meat into classifications such as prime, choice, and the like. Usually, all of the carcasses on a particular rail will not be given the same classification. Thus, if an order is to be filled for meat that is all of the same class, it is necessary for carcasses to be shifted from rail to rail or to be individually picked off of various rails in order to fill the order. Shifting would likewise be required if certain types of carcasses are to be frozen, others to be refrigerated, and others to be subjected to other special processing techniques.

Although various overhead systems have been developed that include rail switching mechanisms, some of which are even automated, no system has as yet eliminated entirely the need to remove carcasses one at a time from one rail for transport to another rail or other location. Heretofore, such individual carcass rail switching has required the services of two or three strong workers to carry each carcass by means of poles which they extend above their heads to take down, to transport, or to hang each carcass. Such operations, in addition to their obvious economic shortcomings, tend to create safety hazards.

It is accordingly an object of the present invention to provide an improved method and device which enables a single worker, with ease, safety, and a small expenditure of energy sources, to remove animal carcasses from overhead rail systems, to easily transport carcasses, and to place carcasses onto such rail systems.

A further object of this invention is an improved method and device for facilitating the arrangement of carcasses according to quality classes or other groupings either in lieu of or in cooperation with switching mechanisms incorporated within overhead rail systems.

The present invention is an improved method including actuating a lifting means of a portable cantilevered means into approximate mating alignment with a carcass suspending means, engaging the lifting means with the suspending means, actuating the lifting means upwardly to free the suspending means from the rail of an overhead rail system, permitting the thus freely suspended carcass to rest upon said cantilevered means, and moving the carcass to a desired location. Also, the present invention is an improved device having a portable cantilevered means which includes a lifting means that is structured for mating engagement with a carcass suspending means whereby the lifting means may raise and lower the suspending means and the carcass may be suspended.

Additional objects, if not set forth specifically herein, will be readily apparent to those skilled in the art from the detailed description of the invention which follows and from the drawings in which:

FIG. 2 is a rear elevation view of the carcass transfer device of FIG. 1;

FIG. 3 is a side elevation view of the device of FIG. 1, with the cowling having been removed for clarity;

It has been determined that heavy and bulky animal carcasses can be easily transported by a single operator off of or onto the rails of an overhead rail system. Such is accomplished by first actuating a lifting means of a portable cantilevered means to position the cantilevered means in approximate mating alignment with a carcass suspending means of the overhead rail system. The lifting means is then actuated upwardly so that the carcass suspending means is free of the overhead rail and the carcass is thereby suspended from the cantilever portion of the cantilevered means. Preferably, the method includes leaning the carcass against a generally vertical portion of the cantilevered means. This leaning imparts added stability to the suspended carcass. The single operator of this device can then easily transport the carcass to a desired location and can also accomplish a suspension of the carcass at any desired location along the rail system.

This latter procedure is undertaken by positioning the suspended carcass at a selected rail system location; by then actuating the lifting means, if necessary, to align the carcass suspending means for mating engagement at that desired point in the system; and then actuating the lifting means downwardly until the carcass suspending means rests upon the rail. The portable cantilevered means is then moved so that the cantilever portion thereof is free of the carcass suspending means resulting in the carcass being suspended upon the overhead rail system for transport therealong, if desired.

In accordance with this method, a single operator transports an animal carcass with safety, with but a small amount of physical effort, while avoiding the need to expend significant amounts of energy, since the only power required is that of a "house" air supply capable of producing air pressure of from about 80 to about 125 lbs./in.$^2$ (approximately 5.6 to 8.8 kg./cm.$^2$). Such air supply is adequate to operate the lifting means actuated by the operator.

Figure 1:
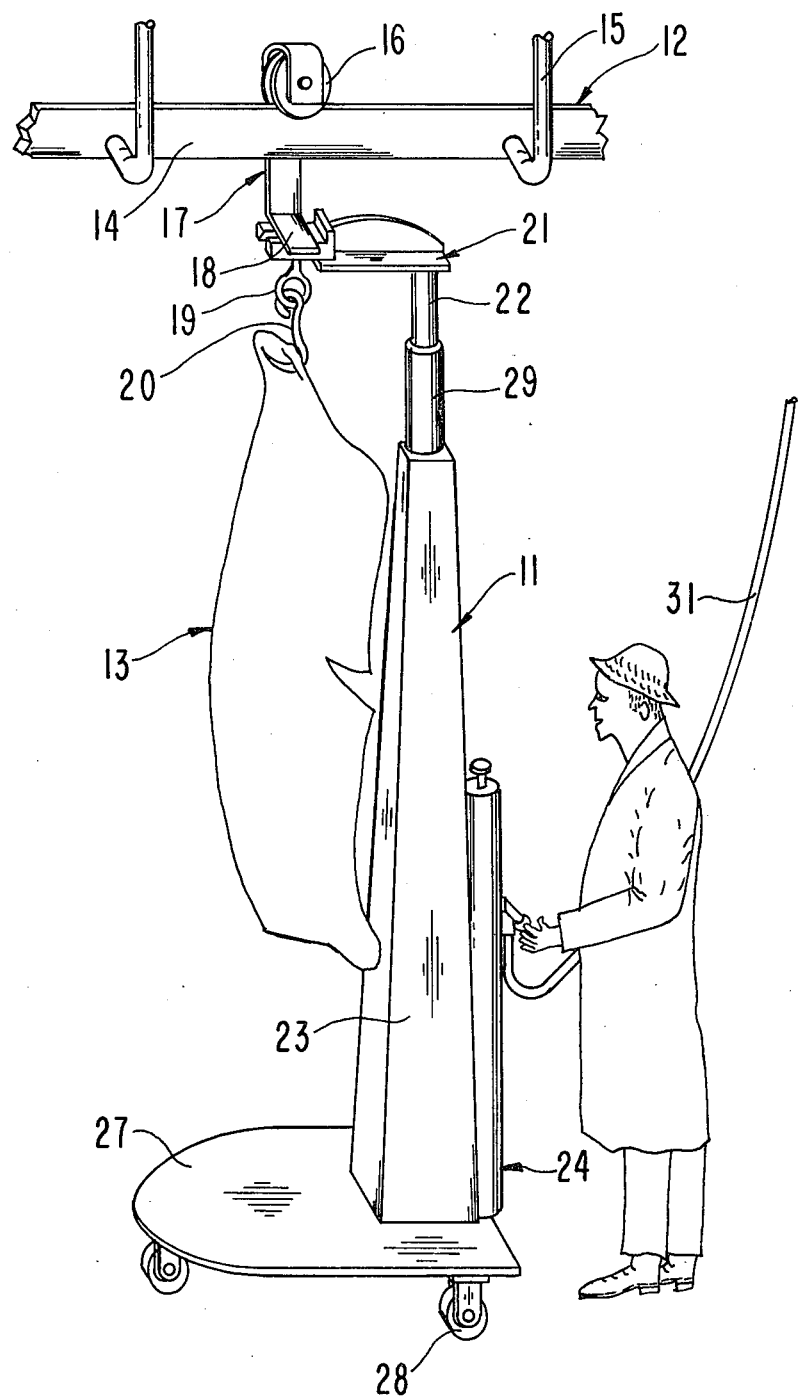
FIG. 1 is a perspective view of a preferred embodiment of the present invention.

FIG. 1 illustrates the carcass transfer device, including a portable cantilevered means, generally indicated by reference 11, shown in mating engagement with a conventional overhead rail system, indicated generally by reference 12, and an animal carcass 13. The illustrated overhead rail system 12 includes a rail 14 and brackets 15 which suspend the rail 14 from a ceiling (not shown) such that the top edge of the rail 14 is unobstructed substantially throughout its length. Resting upon such top edge is a conventional carcass suspension means, including a rail wheel 16 of a roller-type trolley, generally indicated by reference numeral 17. Vertically mounted from a bottom flange 18 of said trolley 17 is an eye 19, from which an animal carcass hook 20, for securing carcass 13, is suspended.

Figure 4:
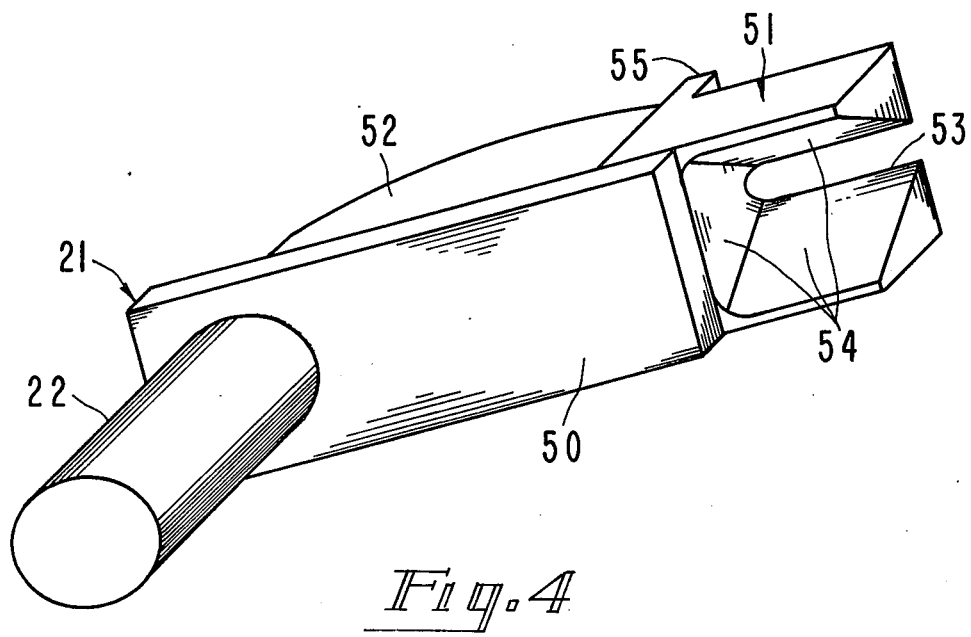
FIG. 4 is an enlarged perspective view of a portion of the apparatus of FIGS. 1-3.

The cantilevered means 11 includes a slotted hooking member, generally indicated by reference numeral 21, which is securely mounted to the top of a mast 22 in cantilevered fashion. Slotted hooking member 21, shown in more detail in FIG. 4, is structured to engage the underside of flange 18 above eye 19. Preferably, the mast 22 is laterally supported by a cylindrical guide member 29.

The structural features of the transfer device 11 can be best seen in FIGS. 2 and 3, especially in FIG. 3, from which protective cowling 23 has been omitted for clarity. Preferably, cowling 23 not only serves to protect much of the device from impacts, dust and other particles, but it also is structured and positioned such that a carcass 13, when suspended from hooking member 21, will lean against or rest upon cowling 23 so as to impart added stability to carcass 13 as it is moved, especially by preventing the development of a pendulum effect.

Mast 22 is rigidly secured to a lifting means, generally indicated by numeral 24. Means 24 must have sufficient power and durability to repeatedly lift and lower a whole steer or other animal carcass. The means 24 must also exhibit precise and relatively unyielding responsiveness upon the actuation thereof, both when burdened with a carcass and also when not so burdened. The preferred lifting means 24 includes a hydraulic cylinder 25 which is in communication with an oil reservoir 26. Both hydraulic cylinder 25 and oil reservoir 26 are rigidly mounted upon base 27, which is in turn mounted upon a plurality of wheel members 28. Wheel members 28 can be either rigidly mounted or mounted in a swiveled manner to permit the variable orientation thereof. Preferably, there are provided three wheels 28, two being rigidly mounted on either side of the rear portion (the portion on which lifting means 24 is mounted) of the base, and the third being mounted in a swiveled manner toward the front, center of the base.

Figure 5:
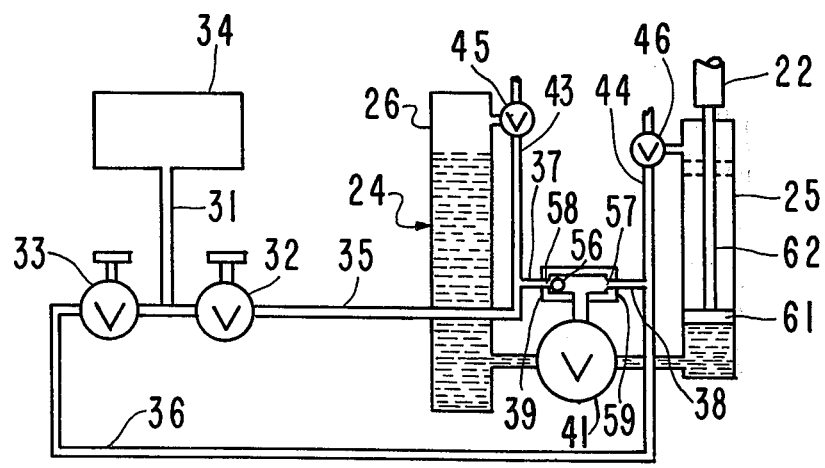
FIG. 5 is a schematic diagram of the preferred operational system of the device shown in FIGS. 1-4.

By means of air supply conduit 31, each of two biased closed, button operated air valves, a must raising valve 32 and a mast lowering valve 33, communicate with a source of pressurized air, preferably a house pressurized air source 34 (FIG. 5). An air transfer conduit 35 connects valve 32 with a T-fitting 37. Similarly, an air transfer conduit 36 connects valve 33 with a T-fitting 38. Each T-fitting 37, 38 communicates with a two-way check valve 39 which is in communication with a biased closed oil control valve 41 positioned between the respective approximate base ends of the hydraulic cylinder 25 and the oil reservoir 26. When control valve 41 is in its biased closed position, oil is prevented from flowing between cylinder 25 and reservoir 26; when open, oil can flow therebetween in either direction.

A further air transfer conduit 43 puts T-fitting 37 into communication with an exhaust valve 45, while another further transfer conduit 44 puts T-fitting 38 into communication with an exhaust valve 46. Exhaust valve 45 has two other openings, one to atmosphere, and the other to near the top end of oil reservoir 26. Exhaust valve 46 likewise has two other openings, one to atmosphere, and the other to near the top end of hydraulic cylinder 25. Exhaust valves 45, 46 are biased open such that respective conduits 43, 44 and the top of each of cylinder 25 and reservoir 26 are open to atmosphere.

The perspective view of FIG. 4 shows a preferred structure of the slotted hooking member 21. Member 21 includes a support member 50 and a slotted member, generally indicated by numeral 51, and can include a brace 52 for imparting added strength and rigidity to the rigid mount between members 50 and 51. In the preferred structure depicted, the slotted member 51 includes a U-shaped slot 53 having beveled edges 54. The top surface of the slotted member 51 is substantially flat except for a stop 55 along the rear edge thereof. This structure enables the operator to position hooking member 21 above eye 19 such that the bottom flange 18 of the trolley 17 rests upon the top surface of slotted member 51 and butts up against the stop 55. Preferably, hooking member 21 is tilted slightly such that the slotted, front edge thereof is somewhat higher than the rear edge thereof, so as to permit the weight of a carcass to assist in maintaining the butting relationship between bottom flange 18 and stop 55 while the carcass is being transported. Generally, the tilt will be such as to assist the carcass 13 in resting on cowling 23 (FIG. 1).

Reference is now made to the schematic diagram of the preferred hydraulic circuit depicted in FIG. 5. Mast 22 is raised by opening the mast raising valve 32, while the mast lowering valve 33 remains closed. This permits pressurized air from the source 34 to flow into both T-fitting 37 and into exhaust valve 45. Exhaust valve 45, upon being subjected to said pressurized air, closes its otherwise opened vent to the atmosphere and directs the flow of pressurized air into the approximate top end of oil reservoir 26.

The pressurized air, on flowing into T-fitting 37 is passed into two-way check valve 39, which directs the pressurized air into oil control valve 41 and simultaneously prevents flow thereof into T-fitting 38. In its preferred construction, which can be seen in FIG. 5, check valve 39 includes a floating ball 56 within a T-shaped channel 57 having stops 58, 59 such that ball 56 is free to move along the substantially horizontal section of channel 57 between stops 58, 59. Oil control valve 41 is normally closed and is opened upon pressurized air flowing thereinto from check valve 39 to thereby permit oil to flow between the respective bottom ends of the oil reservoir 26 and the hydraulic cylinder 25.

Accordingly, the opening of air valve 32 both increases the air pressure within the top end of oil reservoir 26, which pressure increase is transmitted downwardly upon the oil within the reservoir 26, and also opens oil control valve 41 to enable some of the thus pressurized oil to flow into hydraulic cylinder 25 and hydraulically raise cylinder piston 61 and piston shaft 62 to thereby raise the mast 22.

Mast 22 is lowered by opening mast lowering valve 33, while mast raising valve 32 remains closed. This permits pressurized air from the source 34 to flow into both T-fitting 38 and into exhaust valve 46. Such pressurized air closes the otherwise open exhaust valve 46 to increase air pressure within the top end of hydraulic cylinder 25. The pressurized air flowing into T-fitting 38 flows into check valve 39 which both prevents the flow of pressurized air into T-fitting 37 and directs the pressurized air into, and thus opens, the oil control valve 41. The result is that the air pressure within the top portion of hydraulic cylinder 25 is transmitted onto cylinder piston 61 and to the oil within hydraulic cylinder 25. Some of this oil then flows through valve 41 and into oil reservoir 26 to effect a lowering of mast 22.

The operator, by means just described, raises mast 22, thus raising both trolley 17 and carcass 13 suspended therefrom. Trolley 17 is raised so that its wheel 16 clears rail 14. The operator pushes device 11 forward, i.e., in the direction toward rail 14, until the trolley 17, now resting on member 21, is pushed beyond rail 14. If desired, the operator can now lower mast 22 until the entire trolley 17 is safely below rail 14, and hence the operator is able to roll the device 11 and carcass 13 to a desired location. If that desired location is another rail, the operation described is substantially reversed until wheel 16 rests upon the top edge of such other rail (not shown).

In order for the apparatus to be able to lift whole beef carcasses with a house pressurized air source on the order of about 80 to 125 lbs./in.$^2$, the cylinder piston 58 should have a diameter on the order of from about 3 to about 6 inches. Often, the piston shaft 59 would then have a diameter of approximately 1 inch to about 3 inches. The oil reservoir 26 should have dimensions of this same general magnitude. By way of example only, particularly advantageous results have been attained for use with a house air supply on the order of 100 lbs./in.$^2$ when the cylinder piston 58 has a diameter of about 4 inches, the piston shaft 59 has a diameter of approximately 2¼ inches, and the cylinder piston 58 has a stroke length of about 30 inches.

One of the features of the structure of the device is that the operation of the mast 22 is cushioned by the interposition of the oil reservoir 26 within the otherwise pressurized air circuit. The oil within the circuit slows the action of the pressurized air to provide a smooth movement of the mast 22. Still, this smoothing or cushioning effect does not interfere with the ability of the operator to readily position the mast 22 at a desired height since the circuit provides for a very positive stopping operation. Such positive stopping is due primarily to the fact that, as the operator ceases to depress the air valve, 32 or 33, the oil control valve 41 closes to substantially instantaneously lock the circuit and hence the mast 22 at a desired height. The mast 22 accordingly remains at the desired height even as the weight of carcass 13 is added to or removed from the mast 22. If the substantially incompressible oil were not included within the circuit, the mast 22 would tend to vacillate and sag when the weight is added thereto and would tend to vacillate and rise when the weight is removed.

Obviously, many modifications and variations of the invention as hereinbefore set forth may be made without departing from the spirit and scope thereof, and only such limitations should be imposed as are indicated in the appended claims.

We claim:

1. A method for transporting animal carcasses suspended from an overhead rail system comprising: activating a lifting means of a portable cantilevered means, upwardly extending said portable cantilevered means in a substantially vertical sliding direction until it is in approximate mating alignment with a carcass suspending means of an overhead rail system, moving said portable cantilevered means into mating engagement with said carcass suspending means, upwardly actuating said lifting means to free the carcass suspending means from the rail system, freely suspending the carcass from said portable cantilevered means, leaning a portion of said carcass against a generally vertical portion of the cantilevered means to impart added stability to the carcass and to avoid the development of a pendulum effect by said suspended carcass, and transporting said carcass to a desired location.

2. The method of claim 1, further comprising placing the carcass onto the rail system, including the steps of transporting the carcass to a desired location along the rail system, actuating the lifting means to position the carcass suspending means into approximate suspending engagement with said rail, downwardly actuating the lifting means to suspend the carcass suspending means from the rail, and removing said portable cantilevered means from mating engagement with the carcass suspension means, whereby said carcass is freely suspended from said rail system.

3. The method of claim 2, wherein the actuating steps include supplying a pressurized air source of approximately 80 to about 125 lbs./in.$^2$ above a contained supply of oil.

4. A carcass transfer device comprising: a portable base, a cantilevered means mounted on said base, said cantilevered means including a lifting means, said lifting means including a pressurized air power source, a biased closed mast raising valve and a biased closed mast lowering valve in communication with said power source; said raising valve being in communication with both a two-way check valve and a biased open-to-atmosphere exhaust valve, said exhaust valve also opening into the approximate top portion of an oil reservoir; said lowering valve being in communication with said two-way check valve and another biased open-to-atmosphere exhaust valve, said other exhaust valve also opening into the approximate top portion of a hydraulic cylinder; said check valve being in communicaton with a biased closed oil control valve, said oil control valve being in communication with the respective bottom portions of the oil reservoir and of the hydraulic cylinder, and said cantilevered means being structured for mating engagement with a carcass suspending means.

5. The transfer device of claim 4, wherein said two-way check valve includes a T-shaped channel having a stop at each end of the substantially horizontal section thereof, a floating ball within said horizontal section between said stops, one end of the horizontal section being in said communication with the raising valve, and the other end of the horizontal section being in said communication with the lowering valve.

* * * * *

UNITED STATES PATENT OFFICE
CERTIFICATE OF CORRECTION

PATENT NO. : 4,015,538
DATED : April 5, 1977
INVENTOR(S) : HARRY B. WEBB, JAMES W. LEE and ROBERT B. BLAIR It is certified that error appears in the above-identified patent and that said Letters Patent are hereby corrected as shown below:

The patent should show on its face that it is assigned to Swift & Company of Chicago, Illinois.

Signed and Sealed this twenty-third Day of August 1977

[SEAL]

Attest:

RUTH C. MASON
Attesting Officer

C. MARSHALL DANN
Commissioner of Patents and Trademarks